United States Patent [19]

Loikits

[11] Patent Number: 5,122,276

[45] Date of Patent: Jun. 16, 1992

[54] TRI-MODAL FILTER CANISTER AND METHOD OF USING SAME

[76] Inventor: Daniel J. Loikits, 1854 Main St., P.O. Box 134, Northampton, Pa. 18067

[21] Appl. No.: 603,924

[22] Filed: Oct. 26, 1990

[51] Int. Cl.⁵ .................... B01D 15/00; B01D 15/04
[52] U.S. Cl. .................... 210/663; 210/689; 210/741; 210/742; 210/103; 210/130; 210/261; 210/262; 210/283
[58] Field of Search ............... 210/259, 260, 261, 262, 210/264, 266, 283, 284, 290, 453, 440, DIG. 5, DIG. 6, 97, 103, 130, 90, 741, 742, 739, 96.1, 660, 663, 689, 691, 694

[56] References Cited

U.S. PATENT DOCUMENTS

| | | | |
|---|---|---|---|
| 1,084,030 | 1/1914 | Ramsey | 210/453 |
| 1,866,970 | 7/1932 | Garland et al. | 210/453 |
| 1,981,089 | 11/1934 | Carpenter | 210/261 |
| 1,985,377 | 12/1934 | Lindenberger | 210/284 |
| 2,317,449 | 4/1943 | Flock | 210/284 |
| 2,435,510 | 2/1948 | Rabjohn | 210/284 |
| 2,554,748 | 5/1951 | Lewis et al. | 210/440 |
| 2,559,267 | 7/1951 | Winslow et al. | 210/440 |
| 2,667,273 | 1/1954 | Gardes | 210/453 |
| 2,811,218 | 10/1957 | Winslow | 210/453 |
| 3,136,719 | 6/1964 | Serra | 210/284 |
| 3,285,420 | 11/1966 | Muller | 210/262 |
| 3,875,055 | 4/1975 | Grosboll et al. | 210/266 |
| 4,025,426 | 5/1977 | Anderson et al. | 210/284 |
| 4,120,794 | 10/1978 | Taylor | 210/453 |
| 4,303,518 | 12/1981 | Grosshandler | 210/453 |
| 4,436,623 | 3/1984 | Cullen et al. | 210/DIG. 6 |
| 4,587,016 | 5/1986 | Sumiyoshi | 210/453 |
| 4,946,588 | 8/1990 | Wise | 210/453 |

*Primary Examiner*—Peter Hruskoci
*Assistant Examiner*—Cynthia L. Nessler
*Attorney, Agent, or Firm*—Sanford J. Piltch

[57] ABSTRACT

A tri-modal filter canister adapted to contemporaneously remove both entrained water and suspended solid particles from non-aqueous fluids, said water and particulate removal functions being separate and substantially severable within said filter canister.

25 Claims, 4 Drawing Sheets

TRI-MODAL FILTER CANISTER AND METHOD OF USING SAME

FIELD OF THE INVENTION

The present invention relates to devices for filtering fluids and more particularly to devices to accomplish the substantially contemporaneous removal of suspended particulate matter and entrapped water from non-aqueous fluids.

BACKGROUND OF THE INVENTION

In the operation of systems in a which a heat transfer fluid, refrigerant, jet, diesel or automotive fuel, liquid petroleum lubricant or similar fluid is either used or processed, high concentrations of suspended solid material and entrapped water therein can cause considerable difficulty by either clogging or otherwise obstructing the free passage of said fluids through process piping. Suspended solids such as dirt, metal chips, rust and other foreign material in the fluid can deposit in and clog piping, valves and other process equipment and, in time, necessitate that the operating system be shut down to remove one or more of these solids. In many applications, all particles down to about one micron in size must be removed if these problems are to be avoided.

Also, in many of these fluids, water tends to form hydrated sludges which are difficult, if not entirely impossible, to pump. Excessive quantities of entrapped water can result from such factors as:

(1) inadequate drying or improper storage of factory or refinery supplied fluids;
(2) storage tank vent "breathing";
(3) inadequate total suction head in pumps; and/or,
(4) process piping exposed to water during assembly, installation or repair operations.

Where free standing or absorbed water is a problem, many of these fluids are normally considered to be "wet" when the moisture content therein exceeds about 150 ppm at 70° F. and, in many refrigeration systems, levels below 100 ppm must be maintained if problems such as sludge formation, acid and icing in the cooling coils are to be avoided.

Normally, an operating system using one or more of the these fluids in bulk will include at least one, if not more subsystems adapted to remove, on a more-or-less continuous basis, a sufficient amount of these types of solid and hydrous materials to prevent clogging, ice up and similar difficulties. The removal of suspended material usually involves passing contaminated fluid through one or more strainers and/or filters placed in the process line, while water removal, when necessary, is usually accomplished by passing the fluid through a desiccant such as Anhydrite or Drierite. However, to achieve and preserve the integrity of the cleaned/dried fluid and the system in which it is used, these operations must usually be performed continuously with in-line subsystems, with the result that problems with excessive pressure drop and, in the case of water removal, excessive heat generation may occur. Further, with such filtration systems, it is often necessary to shut down the operating unit of which the filtration subsystem is a part to remove, replace and/or repair it.

SUMMARY OF THE INVENTION

The tri-modal filter canister of the present invention provides a single unit adapted to remove suspended solid materials and other contaminants from fluids. The canister comprises, in combination, a hollow body section, adapted to hold one or more internal elements comprised of a strainer module configured to hold the particles of a granulated coactive material and to remove suspended particles above approximately 1000 microns in diameter and at least one filter element to remove particles in the range of between about 1000 microns and about 1 micron in diameter. Where the fluid is non-aqueous and one of the contaminants is water, the coactive material may be a desiccant. In other cases, the fluid is water and dissolved organic and/or ionic contaminants are involved, in which case the coactive material may be activated charcoal or one or more ion exchange resins.

In the present invention, the strainer module and filter element are independent and separate units which are severable in function. When the internal elements of the tri-modal filter canister comprise both a strainer module and at least one filter element, the canister body further comprises internal means for directing the flow of the fluid first into the strainer module, to remove larger particles therefrom, and then into the filter elements, to produce a final "polished" fluid. The tri-modal filter canister system is further adapted to be taken off-line for quick replacement of the strainer and filters without the necessity of shutting down the operating system.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

DETAILED DESCRIPTION OF THE INVENTION

The following detailed description is of the best presently contemplated mode of carrying out the invention. This description is not intended in a limiting sense, but is made solely for the purpose of illustrating the general principles of the invention.

The various features and advantages of the present invention may be more readily understood with reference to the following detailed description, taken in conjunction with the accompanying drawings, wherein like numbers refer to the same part or feature thereof.

Figure 1:
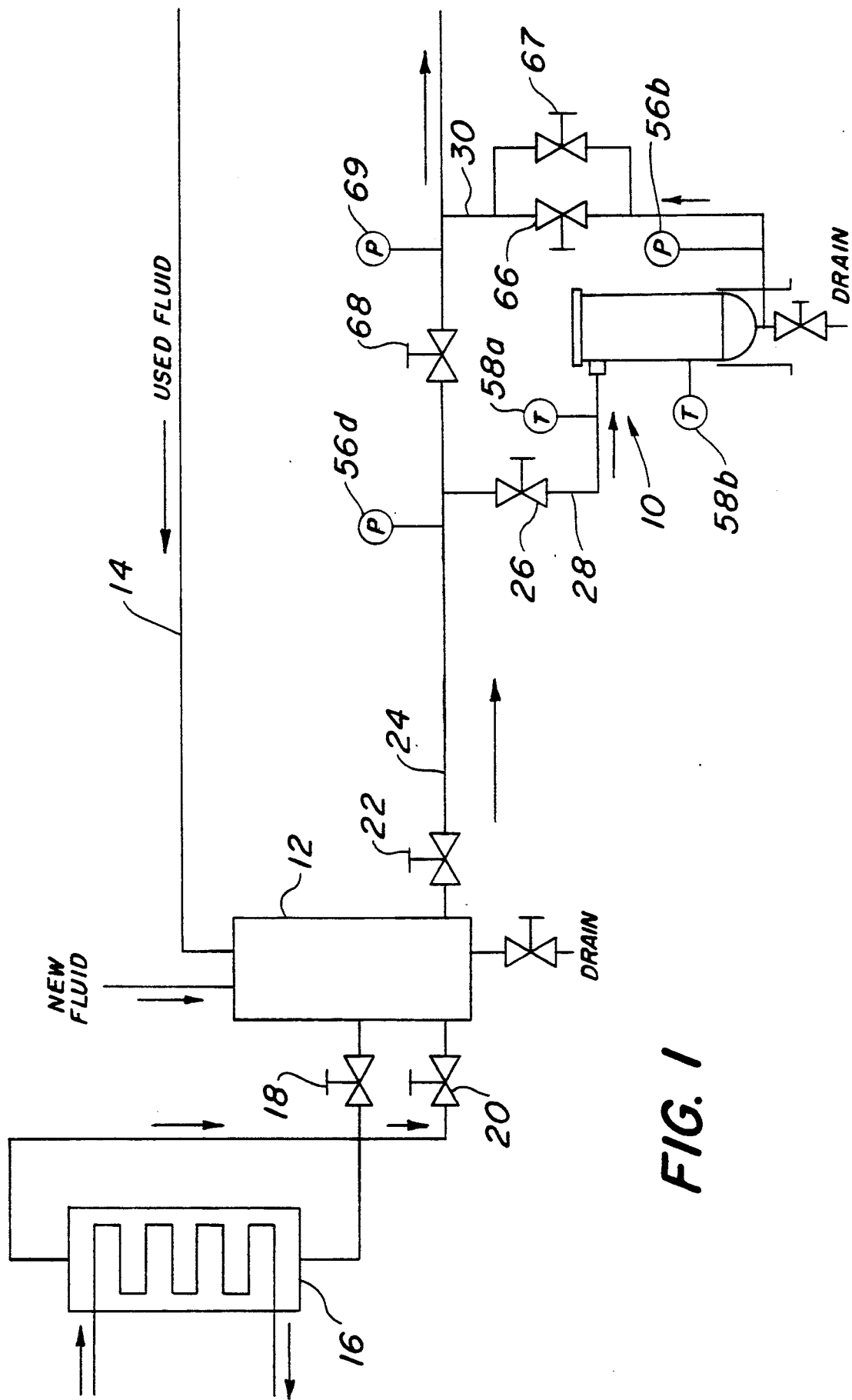
FIG. 1 is a simplified schematic depiction of a typical operating system of which the tri-modal filter canister of the present invention is an integral part thereof.

The tri-modal filter canister of the present invention provides in a single unit the ability to contemporaneously remove both suspended solid materials and entrapped water from non-aqueous fluids with the filtering and dewatering functions being severable. In a second embodiment, the working fluid is water which may have both inorganic and organic contaminants dissolved or suspended therein with the tri-modal canister being configured to remove, at least in part, some or all of these contaminants. A simplified schematic drawing of an exemplary system in which the tri-modal filter canister 10 of the present invention is used is shown in FIG. 1.

As shown therein, this system comprises a storage tank 12 in which the fluid to be filtered is stored. This fluid is received via inlet pipe 14 and it may be either fresh fluid to be processed for the first time or recycled fluid which is to be processed and reused. The fluid may also either be stored in its present thermal condition for future use, or heated or cooled prior to such use in auxiliary process unit 16, the fluid being passed thereinto by opening or closing, as necessary, inlet and outlet valves 18, 20 and 22 which are attached to the piping associated therewith. When the fluid is to be passed through the tri-modal filter canister 10 of the present invention, it passes out of the storage tank 12 through valve 22 and first outlet pipe 24, and then through inlet valve 26 and second inlet pipe 28 into the top portion of canister 10. The now cleaned fluid is recovered from the bottom of the canister 10 via second outlet pipe 30. This may lead to a combuster, if the fluid is a fuel, or, typically, to a heating or cooling system, if the fluid is to be recovered and reused. Not shown, but normally found in most fluid handling systems are components such as pumps, check valves, auxiliary heaters and coolers, sumps and drains, and similar items.

Figure 2:
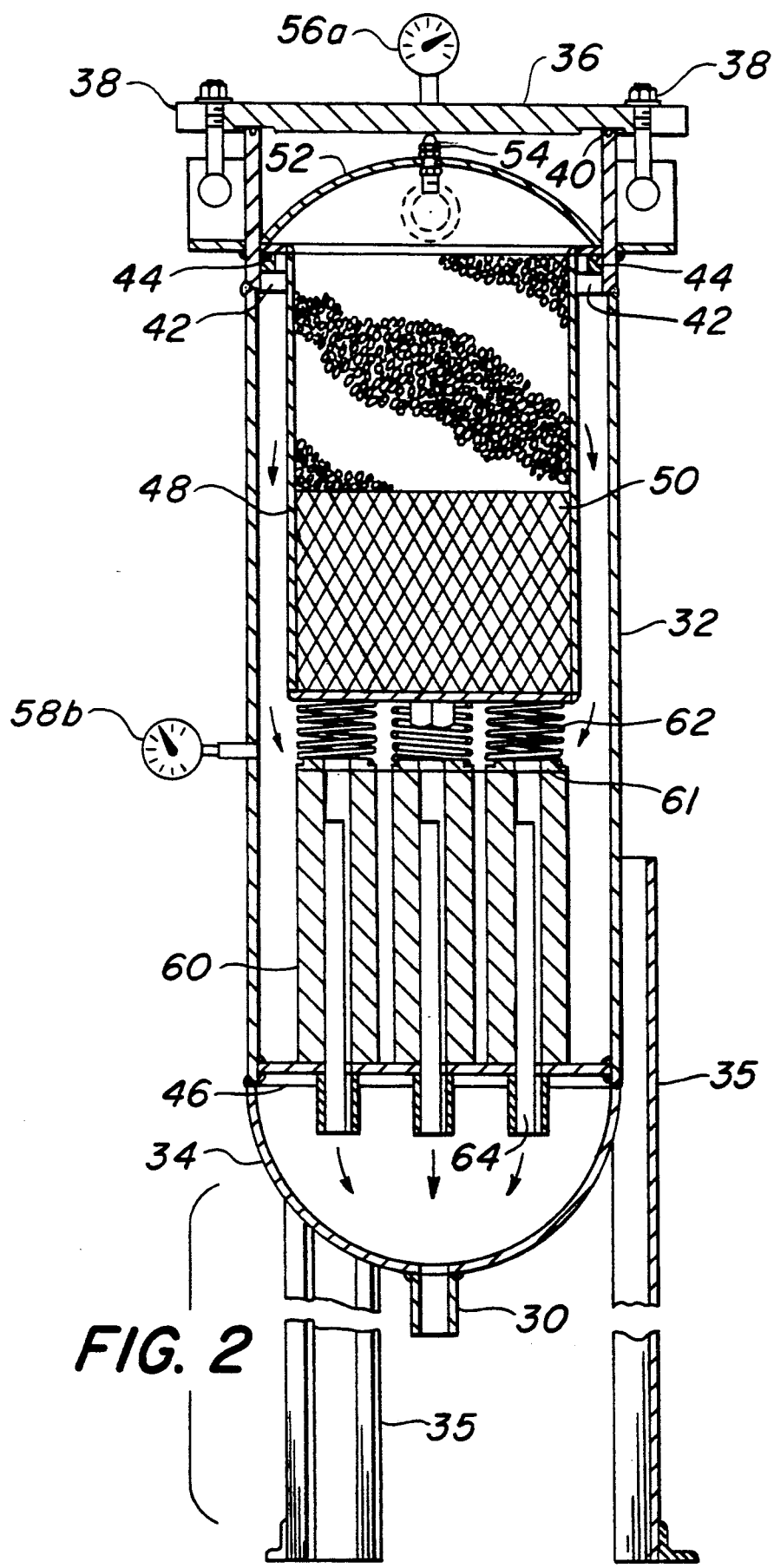
FIG. 2 is a exemplary vertical cross-sectional view of one embodiment of a tri-modal filter canister according to the present invention showing one mode of operation thereof.
Figure 3:
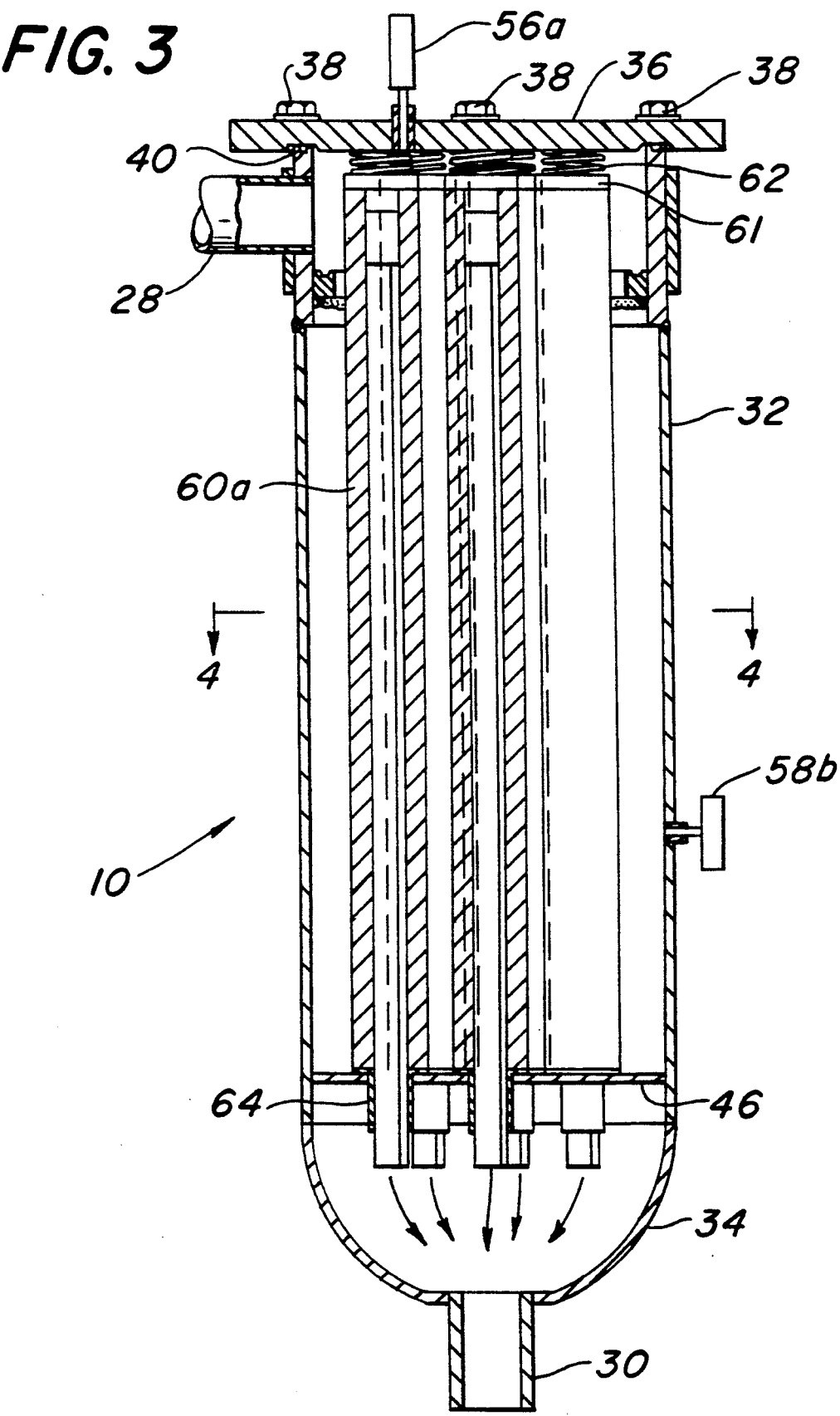
FIG. 3 is a exemplary vertical cross sectional view of a second mode operation of a canister according to the present invention.
Figure 5:
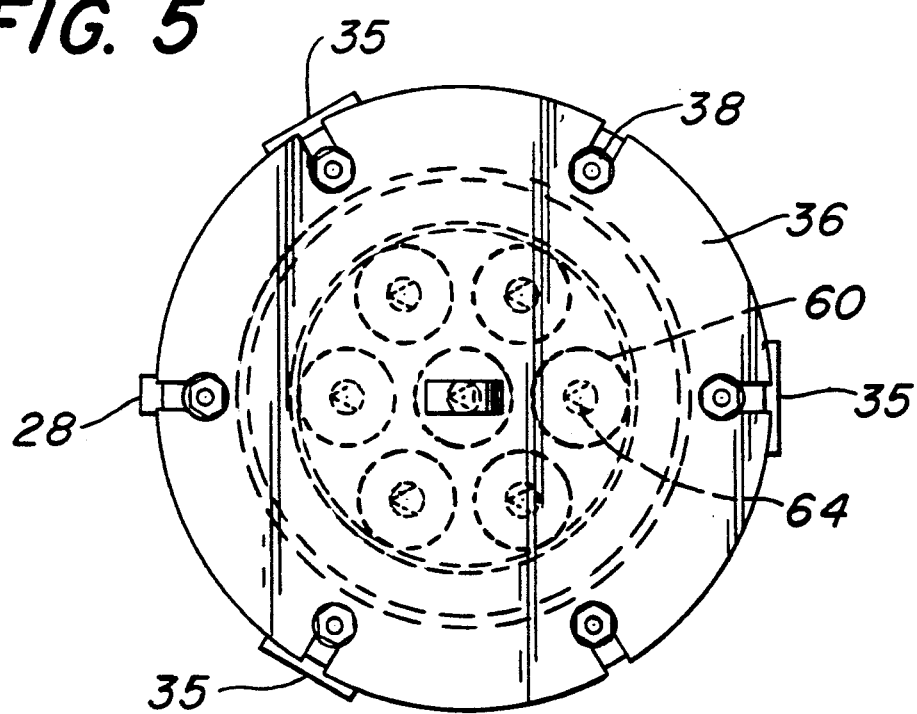
FIG. 5 is a top view of an exemplary tri-modal filter canister of the present invention.

FIGS. 2 and 3 are vertical cross-sectional views of two modes of using an exemplary tri-modal filter canister 10 of the present invention. As shown therein, the basic canister structure comprises a substantially cylindrical vertically oriented hollow body 32, typically fabricated from a strong, corrosion resistant metal such as Schedule 40, 304 stainless steel pipe, said body further comprising a closed substantially hemispherical bottom portion 34 which serves a plenum chamber to receive fluid discharged from the various filter elements therein and to which second outlet pipe 30 is attached, the whole of which being supported on a plurality of mounting legs 35. As shown therein, and more clearly in FIG. 5, the topmost portion of body 32 comprises a flat plate 36 which is sealingly fastened thereto by a plurality of mounting bolts 38. The top plate is flat because, as will be explained in more detail below, such a configuration serves to fix the position of the various internal elements used and clamp them within canister body 32 so that the fluid is directed into the interior thereof such that there is no leakage of unfiltered fluid into the output pipe 30. Sealing of the plate to the body is typically accomplished with an "O" ring 40 which fits into a groove milled into the topmost surface of the hollow body 32. Although any suitable material can be used for the "O" ring seal, PTFE encapsulated silicone rubber is particularly suitable for many applications.

It is recognized that where extremely cold or hot fluids are being processed, or high operating pressures are involved, modification of the seal design may be necessary to prevent leakage or other problems. All of such modifications are considered to be within the scope of the present invention. It is also understood that other structural designs may be used for the basic body structure and that devices such as breech blocks may be used for closing and sealing the hollow canister body 32 without compromising the basic integrity of the tri-modal canister apparatus of the present invention. Whichever type of closure/sealer is used, at some time or other it must be capable of being opened wide enough to allow easy removal and replacement of the internal elements of the canister unit.

Located inside of body 32 and positioned somewhat below the top of hollow body 32 is a cylindrical flange 42 which also has an "O" ring seal 44 fitted into a groove milled into the top surface thereof. This seal is subject to the same constraints as those noted above for "O" ring seal 40. Also located at the bottom of the interior of the case cylinder, at about where the hemispherical bottom portion 34 is attached thereto, is filter support plate 46 onto which the working elements of the filtration system are set.

In all modes of operating the tri-modal filter canister 10 of the present invention, the fluid to be cleaned enters into an open plenum chamber at the top of the body 32. The fluid being passed through the canister may be at any temperature between about $-185°$ F. and about $200°$ F.

In those situations where water is one of the contaminants to be removed, the first internal element of the filter canister 10 is typically a strainer module 48 containing a granular coactive material comprising at least one desiccating material which is retained within the interior of a strainer basket 50. To assure that all of the fluid passes into and through the stainer module, it further comprises an internal domed cover 52, which sealingly abuts the "O" ringed upper surface of flange 42 and blocks off fluid access to that portion of body 32 below flange 42. In the embodiment, as particularly shown in FIG. 2, sealing of domed cover 52 is facilitated by bolt 54. This extends through the top of the dome to the underside of cover plate 36 so that when the tri-modal filter canister is "buttoned up," the pressure of the bolt 54 being pushed down onto domed cover 52 forces it tightly against "O" ring 44. As a result, the incoming fluid from pipe 28, which is adapted to enter the interior of the body at a location which is inside the plenum space underneath the dome, can only flow into the interior of strainer 48. It is understood that the specific design of the canister body 32 and overall size of the strainer, and indeed of the canister itself, will vary depending on the nature and quantity of fluid being processed, its temperature and pressure, the desired residence time of the fluid in the strainer, and the degree to which it is contaminated with solid particles and water.

The strainer basket 50 is made from wire mesh, preferably of stainless steel or other corrosion and abrasion resistant metal, or other inert perforated material having a gross size adequate to hold in the interior thereof a sufficient amount of a solid desiccating material to lower any water in the fluid to, for example, below about 100 ppm with a mesh small enough to cause the removal of any large (i.e. >1000 microns) particles of particulate matter which may have entered the tri-modal filter canister 10 with the fluid. What is a "sufficient" amount will, of course, depend on the nature of the fluid, its temperature and pressure, and the quantity of water which must be removed therefrom.

The residence time to accomplish this degree of improvement is typically between approximately 15 seconds and 5 minutes, with between approximately 30 seconds and 2 minutes being preferred, and between approximately 45 seconds and 75 seconds being the most preferred. In order to accomplish this most preferred residence time, a throttling or flow regulation control of the fluid through the canister is required. A by-pass valve 67 will accomplish such result adequately which valve will be discussed in greater detail below.

Because of the need to provide maximum utility for this system, the solid desiccator is typically provided in granular form having a particle size between about 6 mesh and 8 mesh (2380 microns). This will provide sufficient open space between the particles to allow free passage of the fluid therethrough while effectively serving to remove any large particles which have entered into the system during the construction or operation thereof. In use, particles of desiccant will also break off so the perforated material used to make strainer basket 50 must be selected to have perforations small enough to retain such material. Experimentation has shown that a strainer material of about 14–16 mesh (1410 to 1190 microns) in size is satisfactory for this purpose. Where the strainer module 48 is used primarily for water absorption and does not contain a significant quantity of extraneous solid material, the desiccant therein can be recovered for reuse simply by passing a stream of a hot (i.e. above 400° F.) dry gas, such as $CO_2$, $N_2$ or even hot air, through it for a time sufficient to evaporate and carry off the absorbed water.

Used in conjunction with tri-modal filter canister 10 are a pair of pressure gages 56a and 56b, respectively. These gages measure the pressure drop across the canister 10. In a clean system, this will typically run between approximately 4 and 7 psig depending on the pressure, temperature, viscosity and density of the fluid. As solid material is removed from the fluid and the working elements of the system become plugged, the pressure drop across the canister rises. In a typical system, when the pressure drop increases by between about 15% to 20% of that observed with the clean system, the canister 10 is considered to be plugged and the working elements therein may need to be changed.

In addition to monitoring pressure drop, there are two other operating parameters which must be monitored to assure that the system is operating satisfactorily—residual water content and fluid temperature. The final water content of the fluid can be routinely determined on a periodic basis by an analytical technique, such as the Karl Fischer Test on aliquot samples of the polished fluid. Continuous testing, using one or more automatic test units such as a Fisher model 447 Coulomatic Titrimeter (not shown) can also be used.

Temperature change must be measured because all desiccant materials emit discrete amounts of heat for each pound of water they absorb. This is not only true of "conventional" desiccating materials, such as anhydrous calcium sulfate, but for molecular sieve materials as well. Many working, or "functional" fluids, particularly refrigerants, are quite sensitive to this phenomenon and will not work effectively if they are heated to much in the dewatering operation. Consequently, the tri-modal filter canister 10 further comprises a set of thermometers 58a and 58b, respectively, located at the entrance and discharge areas of strainer module 48 to measure the "delta-T" (in ° F.) of the fluid. Although dial gages are shown in the figures for measuring pressure drop and temperature changes, it is understood that many automated comparative measuring systems, some with automatic telemetry, are now available and any of these can be used without difficulty. Such units are particularly desirable where the canister unit 10 operates in remote or hazardous areas.

In operation, it is found that only desiccants generating less than about 1600 BTU per pound of water absorbed can be safely used with most fluids being treated, particularly when refrigerant materials are involved. This criterion is found to eliminate most, if not all molecular sieve materials from consideration for this work. As a practical matter, the temperature rise of the treated fluid should be held to a range of between approximately 4° and about 10° F., depending upon both the size of the system and the amount of fluid being treated. A larger increase indicates that the wrong desiccant may have been used and a smaller increase indicates that the desiccant is becoming saturated with water and should be changed.

Any solid dry desiccant meeting these above-described criteria can be used in strainer module 48. One material which has been shown to meet these criteria is available commercially as Drierite 8 mesh from the W. A. Hammond Drierite Company, and others such as the Mallinckrodt Chemical Company. This has a density of about 65 pounds/ft$^3$ and the particles will occupy about 50% of the bed volume. Consequently, for a maximum liquid flow rate of three gallons per minute and with a residence time of one minute, about six gallons (0.8 ft$^3$) of desiccant material would be required. Experience with this material shows that a working system having about 50 pounds of desiccant and a fluid residence time of about one minute in the strainer at a flow rate of about 3 gallons per minute, easily maintained a dry working fluid at below about 100 ppm of water in methylene chloride without difficulty, until about six pounds of water were removed.

Figure 4:
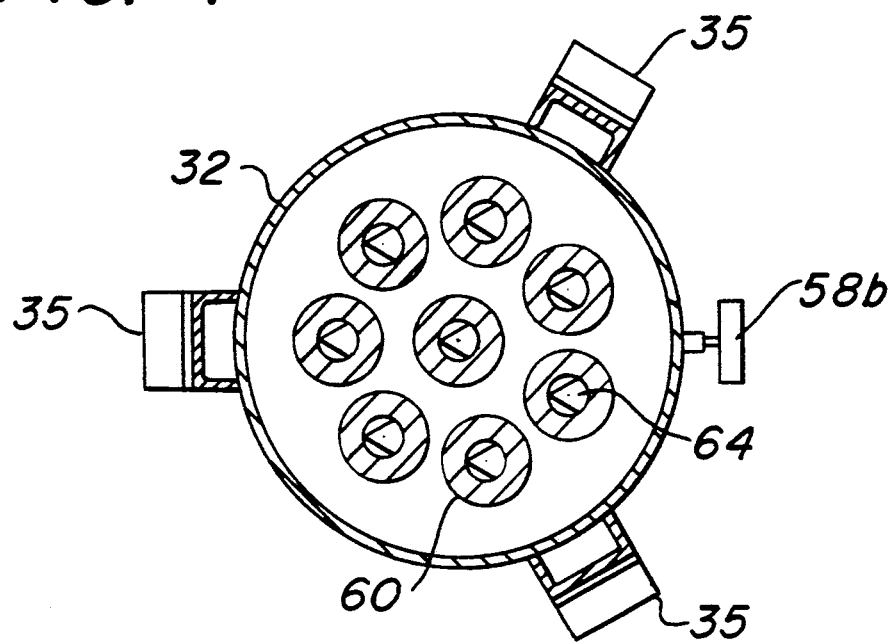
FIG. 4 is a horizontal cross sectional view of the tri-modal filter canister of FIG. 3 taken along line 4—4.

To remove particles smaller than about 1000 microns, the tri-modal filter canister 10 further comprises a plurality of filter elements 60 located, in the embodiment of FIG. 2, directly beneath stainer module 48. Each of filter elements 60 is positioned to rest on filter support plate 46 so that it will fit over a hole therein, so that the filtered fluid discharged therefrom flows directly into hemispherical portion 34 and second outlet pipe 30. The particular embodiment illustrated in FIGS. 4 and 5 has seven of filter elements 60 located therein in approximately a "close packed" hexagonal form. It is understood that in larger or smaller versions of hollow body 32, a different number of filter elements 60 may be required.

Regardless of the number of filter elements used, each of them is biased to sealingly engage the filter support plate 46 by an adjustable bias means, such as a spring 62 located between the bottom surface of strainer basket 50 and one of a set of end caps 61 positioned on the upper end of each of filters 60. Any non-reactive material may be used for these end caps. Shifting of the filter elements 60 is prevented by filter guides 64 which are mounted on the interior circumference of the outlet holes in filter support plate 46 and extend into the interior of each filter element body.

In the operation of the embodiment of FIG. 2, the fluid coming out of strainer module 48 (which still has some quantity of particles smaller than 1000 microns therein) drops into the plenum space surrounding the filter elements 60, from which plenum it must enter the filter elements for final particulate removal or "polishing" before it can exit from the canister body 32. Filter elements commercially available for this purpose can easily remove particulate material down to about one micron is size. Since "nominal" one micron filter elements typically exhibit a ±20% breakthrough, a three micron particle could "escape" filtration. To minimize the possibility of fluid bypass, the filter seating areas on filter support plate 46 are typically machined to a 32 RMS or better finish. Since the arithmetic average deviation of 0.000032" is less than the size of a one micron (0.000036") particle, the retention of all particles above 1 micron within the filter medium is effectively established and maintained.

The tri-modal canister 10 of the present invention has three separate modes of operation. The first of these modes is typically used with a new or reconditioned operating system which usually contains a large amount of water and/or debris, such as dirt, metal chips, rust and other solid particulate contamination formed during the construction operations and initial operation of the system. This initial mode of operation comprises using the canister with only a desiccant laden strainer module 48 contained therein. Where very large quantities of solid contaminants and water must be removed, the strainer module 48 used may be enlarged to extend almost to the bottom of the canister body 32, so that the substantially complete removal of all solid material and water is assured.

Referring to FIG. 1, in placing the canister 10 in operation, valves 26 and 66 are opened, permitting flow through the canister. Valve 68 is closed slightly to achieve a lower pressure at the outlet of the canister (second outlet pipe 30) to achieve the proper flow through the canister in accordance with fluid residence time requirements. Hence, valve 68 creates a fluid pressure throttle control to decrease the process fluid flow at the canister outlet. Further regulating the flow through the canister is a small dimensioned by-pass valve 67. Valve 67, typically of a ⅜" diameter, creates a finer control of the fluid flow as determined by pressure checks among the pressure gages 56a, 56b and 69 (located at the confluence of the canister outlet and the outlet of valve 68). Thus, fluid pressure and residence time can be accurately controlled for proper flow through the canister 10.

When examination of the dewatered/strained fluid shows that the desired overall conditions of system cleanliness and dryness have been reached, it is a relatively simple matter, merely involving the closing of canister inlet and outlet valves 26 and 66, bypass valve 67, and the opening of valve 68 to its full open position to bypass the canister 10 and take it out of the system without the necessity of shutting the overall operating system down. After the top plate 36 is taken off, the used strainer module 48 can be easily removed.

The filter elements 60 are then inserted along with a clean and dry strainer module 48, with the total system now being configured substantially as shown in FIG. 2, with the expectation that a relative long period of trouble free operation will be observed. This is the second mode of operation and when the filter system is operated as described hereinabove, water levels as low as 0.001 ppm can be obtained in many heat transfer fluids such as the various Dowtherms, when the process involves continuous recycling through the tri-flow canister of the present invention.

Where recycled fluids having little opportunity to contact moisture in the air are involved, once the fluid and the operating system have been dewatered and substantially freed of all large particulate matter, the third mode of canister operation can now be used. In this mode, as shown in FIG. 3, the strainer module 48 and its associated short filters 60 are all removed from body 32 and replaced with a matching set of elongated filter elements 60a. These fill substantially the entire volume of canister 32 with biasing springs 62 now bearing against the underside of flat cover plate 36. Where substantially dry and clean fluids are involved, such an arrangement can provide "polished" fluids for a considerable period of time without difficulty.

The tri-modal canister of the present invention is not limited to treating non-aqueous fluids. By merely changing the coactive material in strainer module 48 from a desiccant to activated carbon, for example, it can be used without more to remove a variety of odoriferous, gaseous and dissolved organic materials from drinking water. In still other cases, one or more ion exchange resins may be used therein to remove dissolved metals from industrial waste water. Even coarse sand could be used in the strainer module 48 to remove dirt and other suspended solids from raw river or lake water when it is to be used for drip irrigation or other purposes for which a high degree of solute or odor removal is not necessarily required.

Thus there has been described a new and improved filter canister for contemporaneously removing solid and other contaminents from fluids. It is to be understood that the above-described embodiments are merely illustrative of the many specific embodiments which represent applications and uses of the present invention. Clearly, numerous other arrangements can be readily devised by those of skill in the art without departing from the spirit and scope of the invention as defined in the appended claims and all changes which come within the scope and equivalency of these claims are intended to be embraced therein.

What is claimed is:

1. An apparatus for contemporaneously removing suspended solid and other contaminants from fluids passing therethrough, said apparatus including a canister body comprised of a hollow body section having top and bottom portions, means to admit a fluid into the interior thereof and controllable by-pass means for regulating the residence time of said fluid within said canister, said top portion being a flat plate sealing mated to said hollow body section and fixing the operating position of one or more internal elements within the interior of said hollow body section and clamping the one or more internal elements in the operating position, said one or more internal elements containing an amount of a granular coactive material, said bottom portion comprising means for receiving the fluid discharged from said one or more internal elements and for directing the fluid into an outlet pipe for removing the fluid from the interior of said hollow body section for subsequent use.

2. The apparatus of claim 1 wherein said one or more internal elements are selected from the group consisting of a strainer module and at least one filter element.

3. The apparatus of claim 1 wherein said hollow body section also includes internal means for directing the flow of said fluid first into a strainer module and then into at least one filter element when both a strainer module and at least one filter element are used therein.

4. The apparatus of claim 1 wherein when a strainer module is used as one of the internal elements said strainer module comprises a perforated basket to hold said coactive material and a dome cover sealingly abutting an internal flange in said hollow body section such that when said fluid is admitted into the interior of the hollow body section it can only flow into and through said strainer module.

5. The apparatus of claim 1 wherein said internal elements comprise a strainer module.

6. The apparatus of claim 1 wherein said internal element comprises at least one filter element.

7. The apparatus of claim 1 wherein when one or more filter elements are used in conjunction with a strainer module said hollow body section further comprises a plenum chamber around each of said filter elements into which said fluid from the perforations in the basket of the strainer module flows, said filters being biased to abut an internal filter support plate, said plate having fluid discharge holes therein which direct the fluid discharge into an output plenum in the bottom portion of said hollow body section for removal therefrom.

8. The apparatus of claim 7 wherein the means for biasing said at least one filter element is a spring.

9. The apparatus of claim 1 wherein said fluid is non-aqueous and said coactive material is a granular desiccant.

10. The apparatus of claim 9 wherein said desiccant is granulated anhydrous calcium sulfate having a granule size in the range between approximately 6 and 8 mesh.

11. The apparatus of claim 1 further comprising means for measuring the fluid pressure drop across the filter body.

12. The apparatus of claim 11 wherein said coactive material is a granulated desiccant generating no more than about 1600 BTU per pound of water absorbed.

13. The apparatus of claim 12 further comprising means for measuring the water content and temperature change of the fluid passing therethrough.

14. The apparatus of claim 1 wherein said internal elements comprise at least one filter element and a strainer module.

15. A method for filtering a fluid using the apparatus of claim 13, wherein said method comprises the steps of admitting a stream of said fluid into the interior portion of said apparatus to pass through the one or more internal elements therein while measuring the pressure drop and temperature rise of the fluid as it passes through said coactive material, said method further comprising the step of controlling said bypass means so as to direct at least a portion of said stream around said apparatus to adjust the residence time of said fluid within said apparatus and to keep the pressure drop and temperature rise observed in the discharged fluid within prescribed limits.

16. The method of claim 15 wherein the coactive material in said strainer is a granulated desiccant generating no more than about 1600 BTU per pound of water absorbed.

17. The method of claim 15 further comprising the step of controlling the residence time of said fluid within said hollow body section so that the temperature rise observed in said fluid does not exceed about 10° F.

18. The method of claim 15 further comprising the step of adjusting the bypass means so that the residence time of the fluid passing through said strainer module is held within the range between about 15 seconds and about 5 minutes.

19. The method of claim 18 wherein the residence time of the fluid passing through said strainer module is held within the range between about 30 seconds and about 2 minutes.

20. The method of claim 18 wherein the residence time of the fluid passing through said strainer module is held within the range between about 45 seconds and about 75 seconds.

21. A method for filtering a non-aqueous fluid using the apparatus of claim 14 wherein the coactive material in said strainer is a granulated desiccant, said method comprising the steps of admitting a stream of said fluid into the interior portion of said apparatus to pas through the one or more internal elements therein while measuring the pressure drop and temperature rise of the fluid as it passes therethrough, said method further comprising the step of bypassing at least a portion of said stream around said apparatus to adjust the residence time of said fluid within said apparatus and to keep the pressure drop and temperature rise observed in the discharged fluid within prescribed limits.

22. The method of claim 21 further comprising the step of controlling the residence time of said fluid within said hollow body section so that the temperature rise observed in said fluid does not exceed about 10° F.

23. The method of claim 21 further comprising the step of adjusting the bypass means so that the residence time of the fluid passing through said strainer module is held within the range between about 15 seconds and about 5 minutes.

24. The method of claim 21 wherein the residence time of the fluid passing through said strainer module is held within the range between about 30 seconds and about 2 minutes.

25. The method of claim 21 wherein the residence time of the fluid passing through said strainer module is held within the range between about 45 seconds and about 75 seconds.

* * * * *